United States Patent
Agrawal et al.

(10) Patent No.: US 12,444,215 B2
(45) Date of Patent: Oct. 14, 2025

(54) METHOD AND SYSTEM FOR DETECTING AND EXTRACTING PRICE REGION FROM DIGITAL FLYERS AND PROMOTIONS

(71) Applicant: Tata Consultancy Services Limited, Mumbai (IN)

(72) Inventors: Amit Kumar Agrawal, Kolkata (IN); Mantu Prasad Gupta, Mumbai (IN); Devang Jagdishchandra Patel, Mumbai (IN); Pushp Kumar Jain, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 295 days.

(21) Appl. No.: 18/183,411

(22) Filed: Mar. 14, 2023

(65) Prior Publication Data

US 2023/0377356 A1 Nov. 23, 2023

(30) Foreign Application Priority Data

May 20, 2022 (IN) .............................. 202221029276

(51) Int. Cl.
*G06V 30/14* (2022.01)
*G06V 20/62* (2022.01)
(Continued)

(52) U.S. Cl.
CPC .......... *G06V 30/1444* (2022.01); *G06V 20/62* (2022.01); *G06V 30/164* (2022.01); *G06V 30/18086* (2022.01); *G06V 30/19007* (2022.01)

(58) Field of Classification Search
CPC .. G06V 30/1444; G06V 20/62; G06V 30/164; G06V 30/18086; G06V 30/19007;
(Continued)

(56) References Cited

U.S. PATENT DOCUMENTS

| | | | | |
|---|---|---|---|---|
| 6,757,081 B1 * | 6/2004 | Fan | .................... | H04N 1/00031 358/448 |
| 8,988,463 B2 * | 3/2015 | Stone Perez | ....... | G02B 27/0172 345/634 |

(Continued)

FOREIGN PATENT DOCUMENTS

EP 3032461 A1 * 6/2016 ............. G06V 20/36

OTHER PUBLICATIONS

Ignazio Gallo et al. "Content extraction from marketing flyers," International Conference on Computer Analysis of Images and Patterns, Sep. 2015, Research Gate, https://www.researchgate.net/publication/300474800_Content_Extraction_from_Marketing_Flyers/link/575 5617208ae0405a5751810/download.

*Primary Examiner* — Akwasi M Sarpong
(74) *Attorney, Agent, or Firm* — Finnegan, Henderson, Farabow, Garrett & Dunner, LLP

(57) ABSTRACT

This disclosure relates generally to method and system for detecting and extracting price region from digital flyers and promotions. In retail business, extracting price information from digital flyers is crucial for complex nature of flyers having large variety of formats, color scheme, font styles, variable text information and thereof. The method of the present disclosure detects a text region comprising a price information from a set of digital flyers and promotions received as input images. Further, each text region is converted into a two-color text comprising of a set of white pixels and a set of black pixels. Further, underlying price from the price region of the two-color text is detected and price is extracted from the price region of each input image. Additionally, the price region detection function detects price region accurately and extracts price values having an irregular font size.

12 Claims, 12 Drawing Sheets

Input

Output

Price Region Extraction

(51) Int. Cl.
*G06V 30/164* (2022.01)
*G06V 30/18* (2022.01)
*G06V 30/19* (2022.01)

(58) Field of Classification Search
CPC .. G06V 30/413; G06V 30/414; G06V 30/416; G06V 30/162; G06T 7/136
USPC ........................................................ 382/170
See application file for complete search history.

(56) References Cited

U.S. PATENT DOCUMENTS

| | | | | |
|---|---|---|---|---|
| 9,836,866 | B2* | 12/2017 | Cheung | G09G 5/14 |
| 9,911,033 | B1* | 3/2018 | Harary | G06V 30/19173 |
| 10,002,344 | B2 | 6/2018 | Wu et al. | |
| 10,032,072 | B1* | 7/2018 | Tran | G06F 18/28 |
| 10,181,128 | B2* | 1/2019 | Sharan | G06Q 30/0222 |
| 10,430,649 | B2* | 10/2019 | Pao | G06V 30/413 |
| 10,956,962 | B2* | 3/2021 | Dey | G06Q 30/02 |
| 11,367,092 | B2* | 6/2022 | Zhang | G06V 20/52 |
| 11,570,128 | B2* | 1/2023 | Senftleber | G06Q 50/01 |
| 2005/0251440 | A1* | 11/2005 | Bednarek | G06Q 30/0203 705/7.32 |
| 2007/0127085 | A1* | 6/2007 | Mori | H04N 1/32133 358/403 |
| 2009/0222358 | A1* | 9/2009 | Bednarek | G06Q 30/0601 705/26.1 |
| 2012/0095982 | A1* | 4/2012 | Lennington | G06V 30/00 707/E17.069 |
| 2015/0010233 | A1* | 1/2015 | Barman | G06V 10/20 382/167 |
| 2015/0134457 | A1* | 5/2015 | Cheung | G06Q 30/0251 705/14.64 |
| 2016/0171707 | A1* | 6/2016 | Schwartz | G06F 18/22 382/180 |
| 2016/0292800 | A1* | 10/2016 | Smith | G06Q 50/16 |
| 2018/0315065 | A1* | 11/2018 | Zhang | G06Q 30/0206 |
| 2019/0050932 | A1* | 2/2019 | Dey | G06Q 30/0633 |
| 2023/0196807 | A1* | 6/2023 | Azulai | G06V 30/414 382/176 |
| 2023/0343428 | A1* | 10/2023 | Iyer | G06N 5/022 |

* cited by examiner

Overall Input and Output

Text Region Detection

Text Merging

Input  Output

Text Region Filtering

Input → Output

Input → Output

Two Color Conversion

Input        Output

Price Region Extraction

METHOD AND SYSTEM FOR DETECTING AND EXTRACTING PRICE REGION FROM DIGITAL FLYERS AND PROMOTIONS

PRIORITY CLAIM

This U.S. patent application claims priority under 35 U.S.C. § 119 to: Indian Patent Application No. 202221029276, filed on May 20, 2022. The entire contents of the aforementioned application are incorporated herein by reference.

TECHNICAL FIELD

The disclosure herein generally relates to digital flyers price extraction, and, more particularly, to method and system for detecting and extracting price region from digital flyers and promotions.

BACKGROUND

Recent trends in digital revolution provides businesses with the concept of "digital flyers". Digital flyers (also referred as electronic flyers, online flyers, and Internet flyers) offer a significant cost saving over traditional printed flyers and are "greener" than traditional printed flyers. Thus, digital flyers industry has steadily grown, with many businesses, having an online presence, using digital flyers to market their products and services increasing visibility of physical retailers.

Retailers need complete information about their competitor's pricing and promotions to make sure that they are competitive enough to attract customers. Product digital flyers and brochures are one of the most vital sources of such information. Retail businesses are interested in extracting product data and price information from the digital flyers which is a very important product attribute. Manual extraction is a cumbersome process, so retail business need to automate the extraction of pricing and promotion data from the digital flyers.

In majority of product flyers, price information generally contains dollar amount in larger font and cents in smaller font as subscript or superscript. In addition large variety of formats, color scheme, font styles, text information and placement of textual elements contribute to the complexity of flyer images. In such scenarios, for a given complex nature having large variety of formats, color scheme, font styles, variable text information and random placement of textual elements and specific price format, conventional methods extract content information from the digital flyers but lacks to extract price information from such digital flyer images. Hence there is a necessity of a scalable and efficient technique for extracting price information from the digital product flyers.

SUMMARY

Embodiments of the present disclosure present technological improvements as solutions to one or more of the above-mentioned technical problems recognized by the inventors in conventional systems. For example, in one embodiment, a system for detecting and extracting price region from digital flyers and promotions is provided. The processor is configured in the system acquires a set of digital flyers and promotions as input images from external sources. Further the system detects one or more text regions comprising a price information from each input image from the input images by creating a bounding box around the detected texts in each input image and merging adjacent text regions bounding boxes and filtering the merged text regions. Each text region is converted into a two-color text comprising of a set of white pixels and a set of black pixels by, (i) changing each text region into a gray scale image and selecting top ranked two peaks from a histogram comprising one or more text regions, (ii) calculating a mean value of boundary pixels of the gray scale image, (iii) calculating a mean range based on the peaks closer to the boundary pixel mean value and the peaks farther to the boundary pixel mean value, and (iv) converting one or more pixels in black color which lies within the mean range around peak closer to the boundary pixel mean value and the one or more pixels into white color which falls out of the boundary pixel mean value.

In accordance with an embodiment of the present disclosure, the price region from the two-color text is detected by using a price tag flag status and a price region detection technique and extracting the price from the price region of each input image by using a price tag flag status and a price extraction technique.

In accordance with an embodiment of the present disclosure, the price region detection technique identifies the price region from the two-color text by obtaining the two-color text of each input image and initializing a price tag flag status with a false condition. The price tag flag is configured with a status equivalent to a status of the price region detected from the two-color text. Further, performing when the price tag flag status is false condition to determine a one or more connected values corresponding to each text of the two-color text, and selecting the one or more connected values with a maximum height. Further, computing a first parameter by merging the one or more connected values aligned to an upper left y-coordinate corresponding to the connected values with the maximum height. Computing a second parameter by merging the one or more connected values aligned to a lower left y-coordinate corresponding to the connected values with the maximum height for filtering noise components associated with the two-color text; and reset the price tag flag status with the price tag flag status of the one or more detected price region based on the first parameter and the second parameter.

In accordance with an embodiment of the present disclosure, extracting the price from the price region of each input image by using the price extraction technique Initially, inputting the two-color text input image and setting a price region flag status to a false condition. Further, the one or more connected components corresponding to each text are determined and grouping the one or more connected components based on a height and a position of the text. The one or more groups aligned with the upper left y-coordinate are selected based on the group having maximum height and recording each group in a first list and sorting the first list based on x-coordinates. Further, text from each group are extracted in the first list and merging to form the text string.

In accordance with an embodiment of the present disclosure, perform when the text string matches with a price string format, then the price region flag status is set to a true condition and returning the text string as the price region value.

In accordance with an embodiment of the present disclosure, perform when the text string does not match with the price string format then perform, selecting the one or more groups aligned with the lower left y-coordinates based on the group having maximum height and recording each group in a second list and sorting the second list based on x-coordinates. Further, extracting text from each group in the second list and merging to form the text string, and checking if the text string matches with the price string format, then set the price region flag status to true condition and return the price region value.

In another aspect, a method for detecting and extracting price region from digital flyers and promotions is provided. The method includes acquire a set of digital flyers and promotions as input images from external sources. Further the method detects one or more text regions comprising a price information from each input image from the input images by creating a bounding box around the detected texts in each input image and merging adjacent text regions bounding boxes and filtering the merged text regions. Each text region is converted into a two-color text comprising of a set of white pixels and a set of black pixels by, (i) changing each text region into a gray scale image and selecting top ranked two peaks from a histogram comprising one or more text regions, (ii) calculating a mean value of boundary pixels of the gray scale image, (iii) calculating a mean range based on the peaks closer to the boundary pixel mean value and the peaks farther to the boundary pixel mean value, and (iv) converting one or more pixels in black color which lies within the mean range around peak closer to the boundary pixel mean value and the one or more pixels into white color which falls out of the boundary pixel mean value.

In accordance with an embodiment of the present disclosure, the price region from the two-color text is detected by using a price tag flag status and a price region detection technique and extracting the price from the price region of each input image by using a price tag flag status and a price extraction technique.

In accordance with an embodiment of the present disclosure, the price region detection technique identifies the price region from the two-color text by obtaining the two-color text of each input image and initializing a price tag flag status with a false condition. The price tag flag is configured with a status equivalent to a status of the price region detected from the two-color text. Further, performing when the price tag flag status is false condition to determine a one or more connected values corresponding to each text of the two-color text, and selecting the one or more connected values with a maximum height. Further, computing a first parameter by merging the one or more connected values aligned to an upper left y-coordinate corresponding to the connected values with the maximum height. Computing a second parameter by merging the one or more connected values aligned to a lower left y-coordinate corresponding to the connected values with the maximum height for filtering noise components associated with the two-color text; and reset the price tag flag status with the price tag flag status of the one or more detected price region based on the first parameter and the second parameter.

In accordance with an embodiment of the present disclosure, extracting the price from the price region of each input image by using the price extraction technique Initially, inputting the two-color text input image and setting a price region flag status to a false condition. Further, the one or more connected components corresponding to each text are determined and grouping the one or more connected components based on a height and a position of the text. The one or more groups aligned with the upper left y-coordinate are selected based on the group having maximum height and recording each group in a first list and sorting the first list based on x-coordinates. Further, text from each group are extracted in the first list and merging to form the text string.

In accordance with an embodiment of the present disclosure, perform when the text string matches with a price string format, then the price region flag status is set to a true condition and returning the text string as the price region value.

In accordance with an embodiment of the present disclosure, perform when the text string does not match with the price string format then perform, selecting the one or more groups aligned with the lower left y-coordinates based on the group having maximum height and recording each group in a second list and sorting the second list based on x-coordinates. Further, extracting text from each group in the second list and merging to form the text string, and checking if the text string matches with the price string format, then set the price region flag status to true condition and return the price region value.

In yet another aspect, a non-transitory computer readable medium for acquiring a set of digital flyers and promotions as input images from external sources. Initially, detects one or more text regions comprising a price information from each input image from the input images by creating a bounding box around the detected texts in each input image and merging adjacent text regions bounding boxes and filtering the merged text regions. Each text region is converted into a two-color text comprising of a set of white pixels and a set of black pixels by, (i) changing each text region into a gray scale image and selecting top ranked two peaks from a histogram comprising one or more text regions, (ii) calculating a mean value of boundary pixels of the gray scale image, (iii) calculating a mean range based on the peaks closer to the boundary pixel mean value and the peaks farther to the boundary pixel mean value, and (iv) converting one or more pixels in black color which lies within the mean range around peak closer to the boundary pixel mean value and the one or more pixels into white color which falls out of the boundary pixel mean value.

In accordance with an embodiment of the present disclosure, the price region from the two-color text is detected by using a price tag flag status and a price region detection technique and extracting the price from the price region of each input image by using a price tag flag status and a price extraction technique.

In accordance with an embodiment of the present disclosure, the price region detection technique identifies the price region from the two-color text by obtaining the two-color text of each input image and initializing a price tag flag status with a false condition. The price tag flag is configured with a status equivalent to a status of the price region detected from the two-color text. Further, performing when the price tag flag status is false condition to determine a one or more connected values corresponding to each text of the two-color text, and selecting the one or more connected values with a maximum height. Further, computing a first parameter by merging the one or more connected values aligned to an upper left y-coordinate corresponding to the connected values with the maximum height. Computing a second parameter by merging the one or more connected values aligned to a lower left y-coordinate corresponding to the connected values with the maximum height for filtering noise components associated with the two-color text; and reset the price tag flag status with the price tag flag status of the one or more detected price region based on the first parameter and the second parameter.

In accordance with an embodiment of the present disclosure, extracting the price from the price region of each input image by using the price extraction technique Initially, inputting the two-color text input image and setting a price region flag status to a false condition. Further, the one or more connected components corresponding to each text are determined and grouping the one or more connected components based on a height and a position of the text. The one or more groups aligned with the upper left y-coordinate are selected based on the group having maximum height and recording each group in a first list and sorting the first list based on x-coordinates. Further, text from each group are extracted in the first list and merging to form the text string.

In accordance with an embodiment of the present disclosure, perform when the text string matches with a price string format, then the price region flag status is set to a true condition and returning the text string as the price region value.

In accordance with an embodiment of the present disclosure, perform when the text string does not match with the price string format then perform, selecting the one or more groups aligned with the lower left y-coordinates based on the group having maximum height and recording each group in a second list and sorting the second list based on x-coordinates. Further, extracting text from each group in the second list and merging to form the text string, and checking if the text string matches with the price string format, then set the price region flag status to true condition and return the price region value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
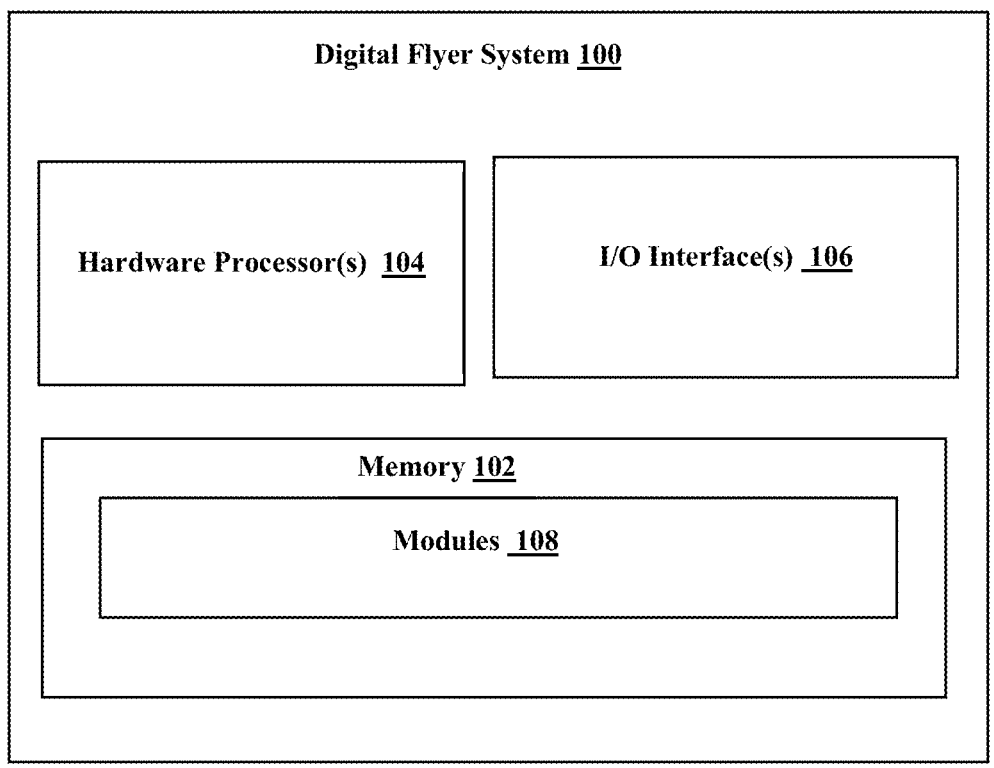
FIG. 1 illustrates an exemplary system for detecting and extracting price region from digital flyers and promotions, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide a method and system for detecting and extracting price region from digital flyers and promotions. The system 100 may be alternatively referred as digital flyer system. The method disclosed enables to extract price information from a price region associated with the digital flyers and promotions. E-commerce has been increasing for marketing in digital flyer to promote products providing special offer for the rise of online shopping. The detection of objects and text extraction from digital flyers has been an enormous challenge. Also, the system and method of the present disclosure is efficient, accurate and scalable with employed price region extraction approach from the digital flyers and promotions. The disclosed system is further explained with the method as described in conjunction with FIG. 1 to FIG. 10B below.

Referring now to the drawings, and more particularly to FIG. 1 through FIG. 10B, where similar reference characters denote corresponding features consistently throughout the figures, there are shown preferred embodiments and these embodiments are described in the context of the following exemplary system and/or method.

FIG. 1 illustrates an exemplary system for detecting and extracting price region from digital flyers and promotions, in accordance with some embodiments of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
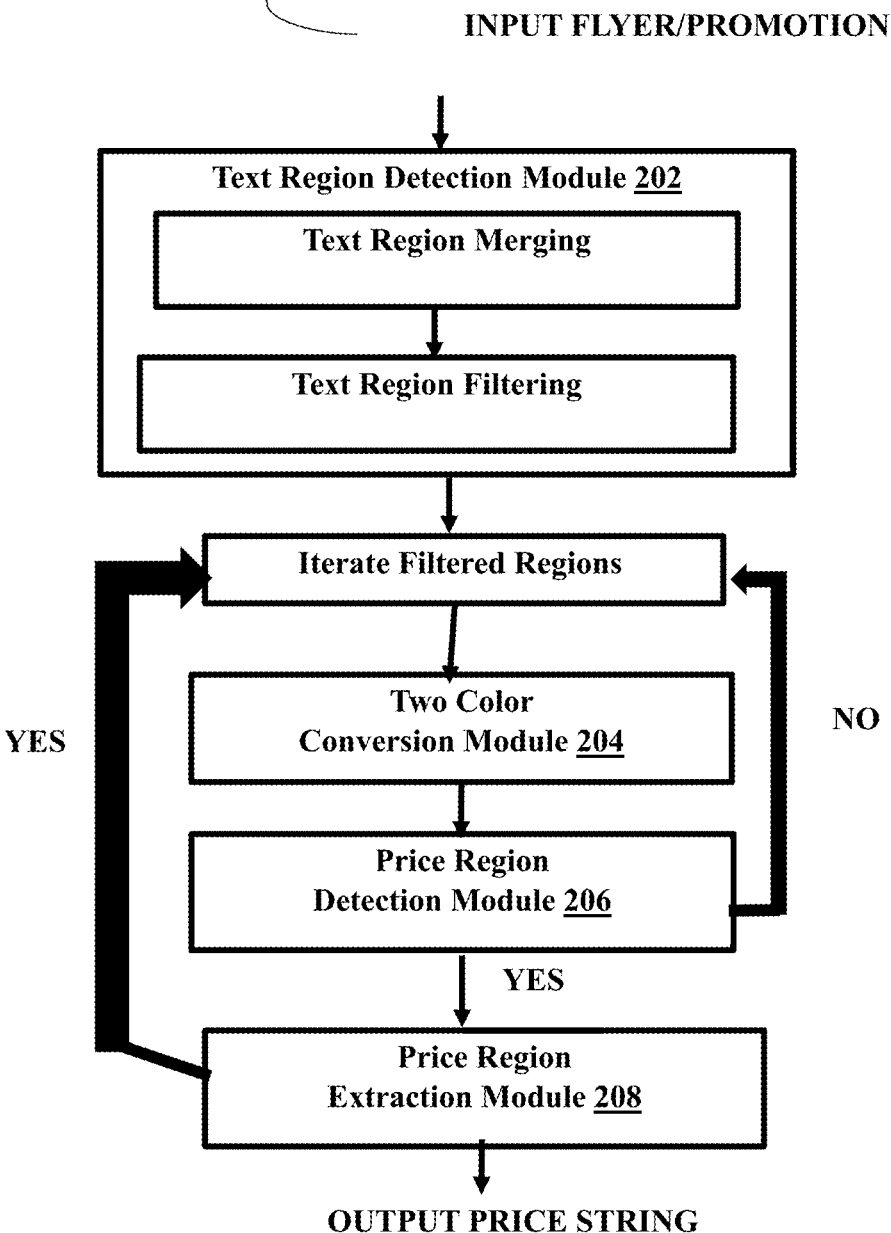
FIG. 2 illustrates an exemplary functional block diagram of the system showing process of detecting and extracting price region from digital flyers and promotions, in accordance with some embodiments of the present disclosure.

FIG. 2 illustrates an exemplary functional block diagram of the system showing process of detecting and extracting price region from digital flyers and promotions, in accordance with some embodiments of the present disclosure. The digital flyer system 100 includes a text region detection module 202, a two-color conversion module 204, a price region detection module 206, and a price region extraction module 208. The digital flyer system 100 receives a set of digital flyers and promotions as input images from external sources or from a digital storage, wherein the external sources includes retail marketing, product advertisement and thereof.

The text region detection module 202 includes a text region merger and the text region filterer to process each digital flyer image by creating a bounding box around the detected texts and merges adjacent text region identifying the price region comprising a price information and filtering the merged text regions.

The two-color conversion module 204 converts each detected text region obtained from the 202 into a two-color text comprising of a set of white pixels and a set of black pixels.

The price region detection module 206 detects a price region from the two-color text obtained from the two-color conversion module 204.

The price region extraction module 208 extracts the price from the price region of each input image associated with the digital flyer image. The present disclosure is further explained considering an example, where the system 100 processes a set of inputs received from the user using the system of FIG. 1 and FIG. 2.

Figure 3:
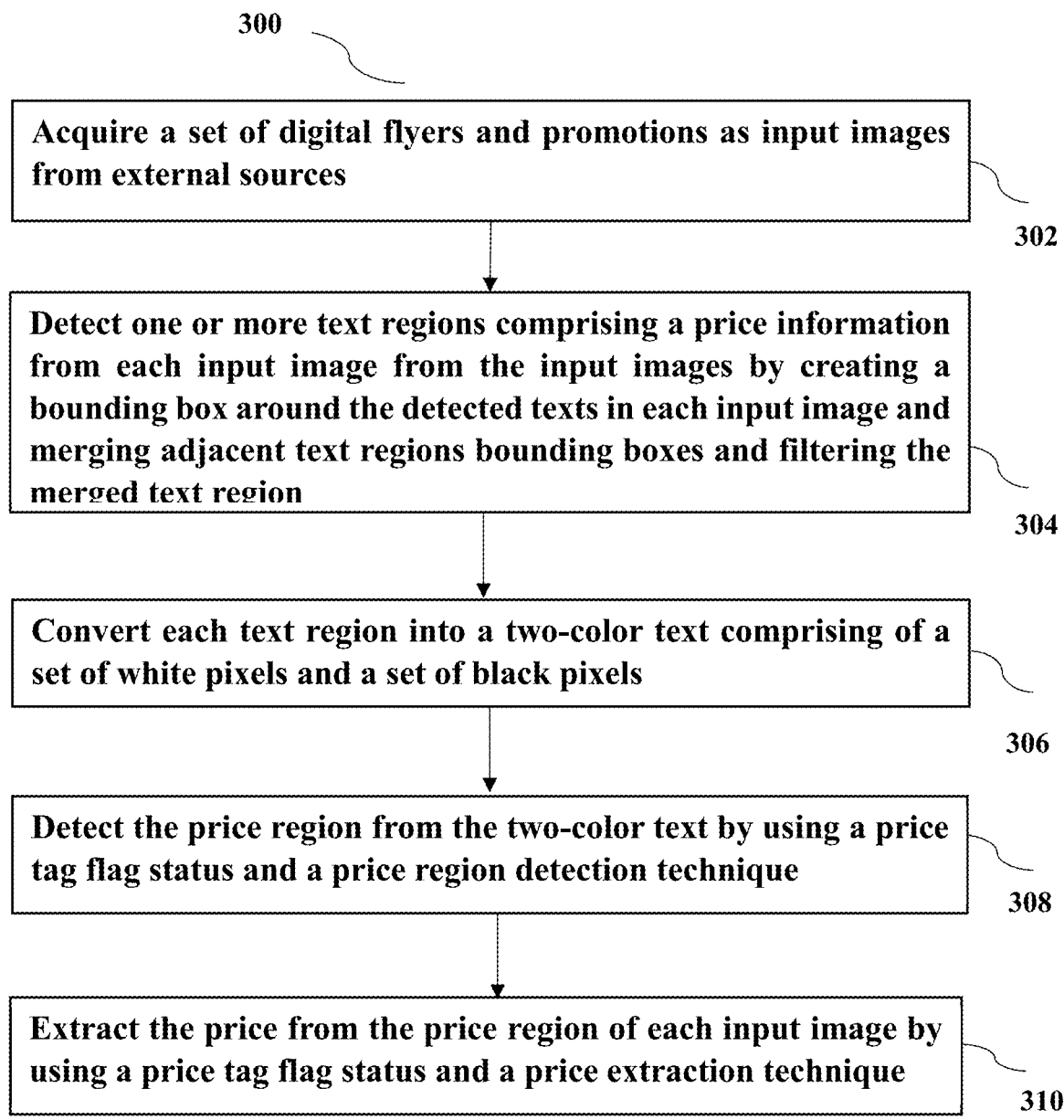
FIG. 3 illustrates a process flow diagram of a method detecting and extracting price region from digital flyers and promotions using the system of FIG. 1, in accordance with some embodiments of the present disclosure.

FIG. 3 illustrates a process flow diagram of a method detecting and extracting price region from digital flyers and promotions, in accordance with some embodiments of the present disclosure. In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 2 through FIG. 10B Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, the one or more hardware processors 104 acquire a set of digital flyers and promotions as input images from external sources. Consider an example where the system 100 receives the digital flyer image as input (FIG. 4) comprising one or more product data.

Figure 4:
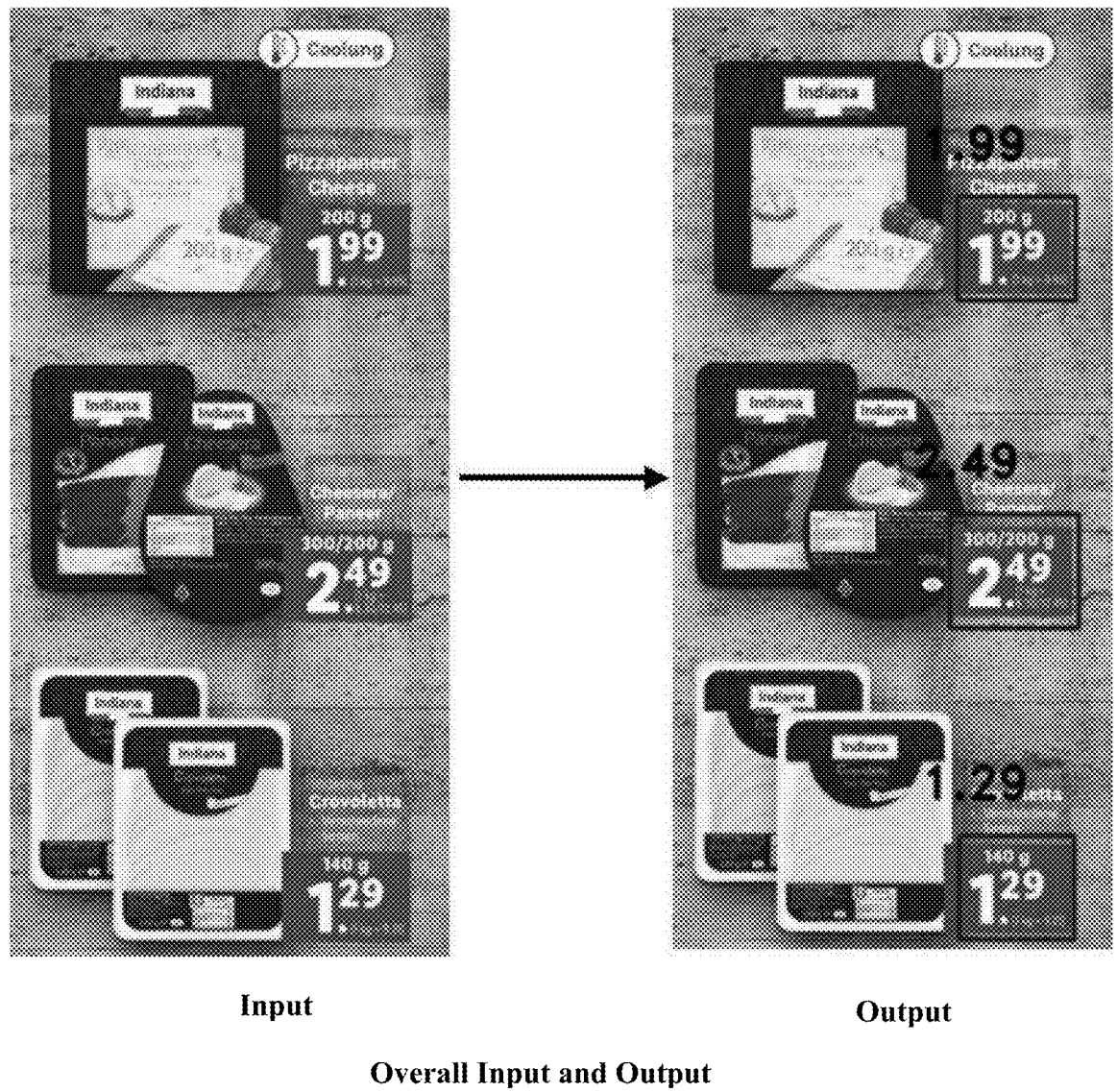
FIG. 4 illustrates an example showing the output of the exemplary digital flyer output image resulting from the input digital flyer image using the system of FIG. 1, in accordance with some embodiments of the present disclosure.

FIG. 4 illustrates an example showing the output of the exemplary digital flyer output image resulting from the input digital flyer image using the system of FIG. 1, in accordance with some embodiments of the present disclosure. Here, each product data contains information with associated price details in accordance with the price value as determined by each product data owner. Each product data value has different aesthetic representation of values which varies with font, color, texture, and as represented. The mentioned digital flyer example has product data with price value such as $1.^{99}$ which represented as 1 dollar and 0.99 cents, $2.^{49}$ which represented as 2 dollar and 0.49 cents, and $1.^{29}$ which represented as 1 dollar and 0.29 cents. It is to be noted that the digital flyer image is not limited to one product data information. The disclosed method is further described considering one product data example processed using the system 100 preceded by the text detection module 202.

Figure 5:
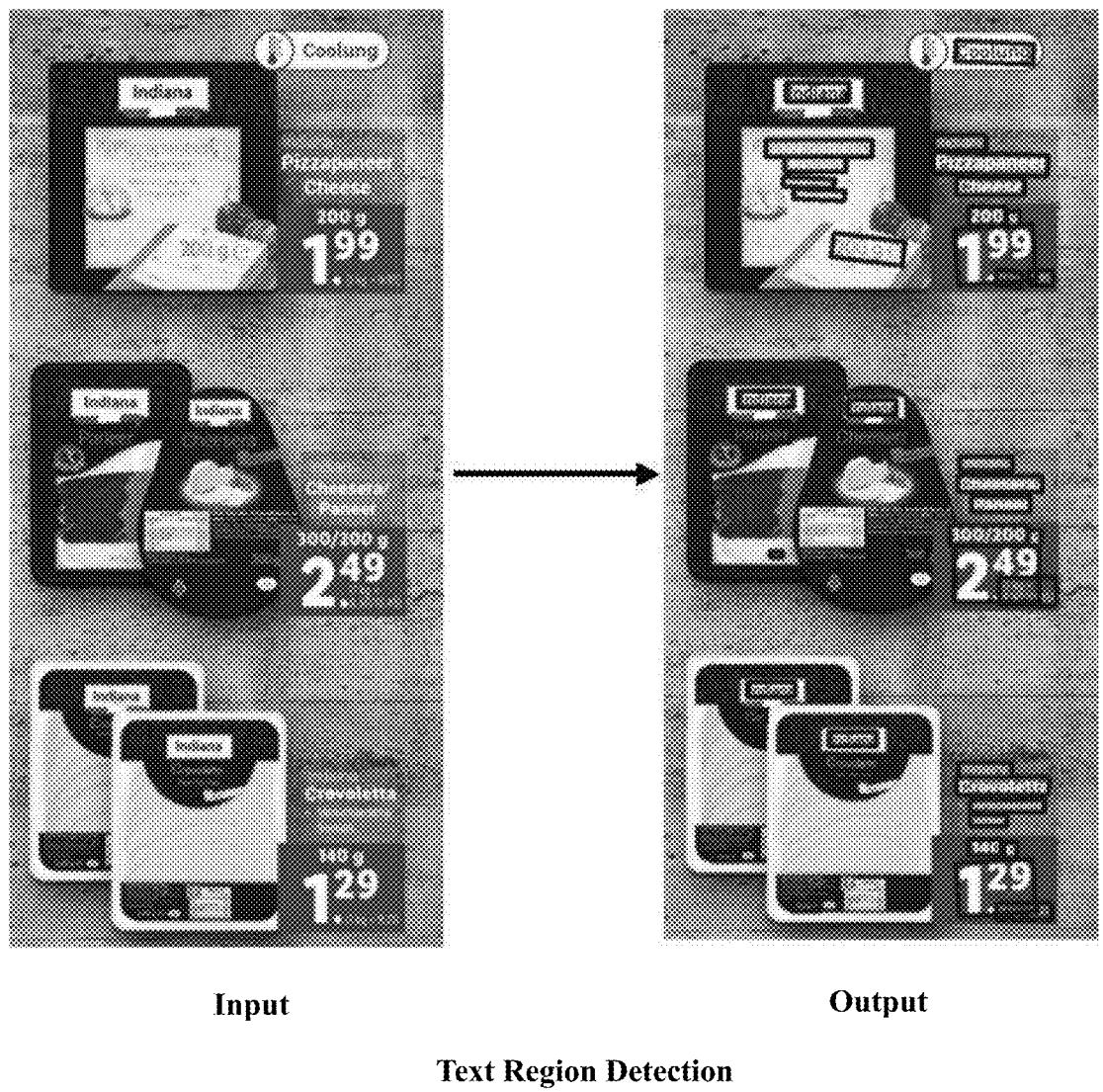
FIG. 5 illustrates an exemplary flyer image detecting text region using the system of FIG. 1, in accordance with some embodiments of the present disclosure.
Figure 6:
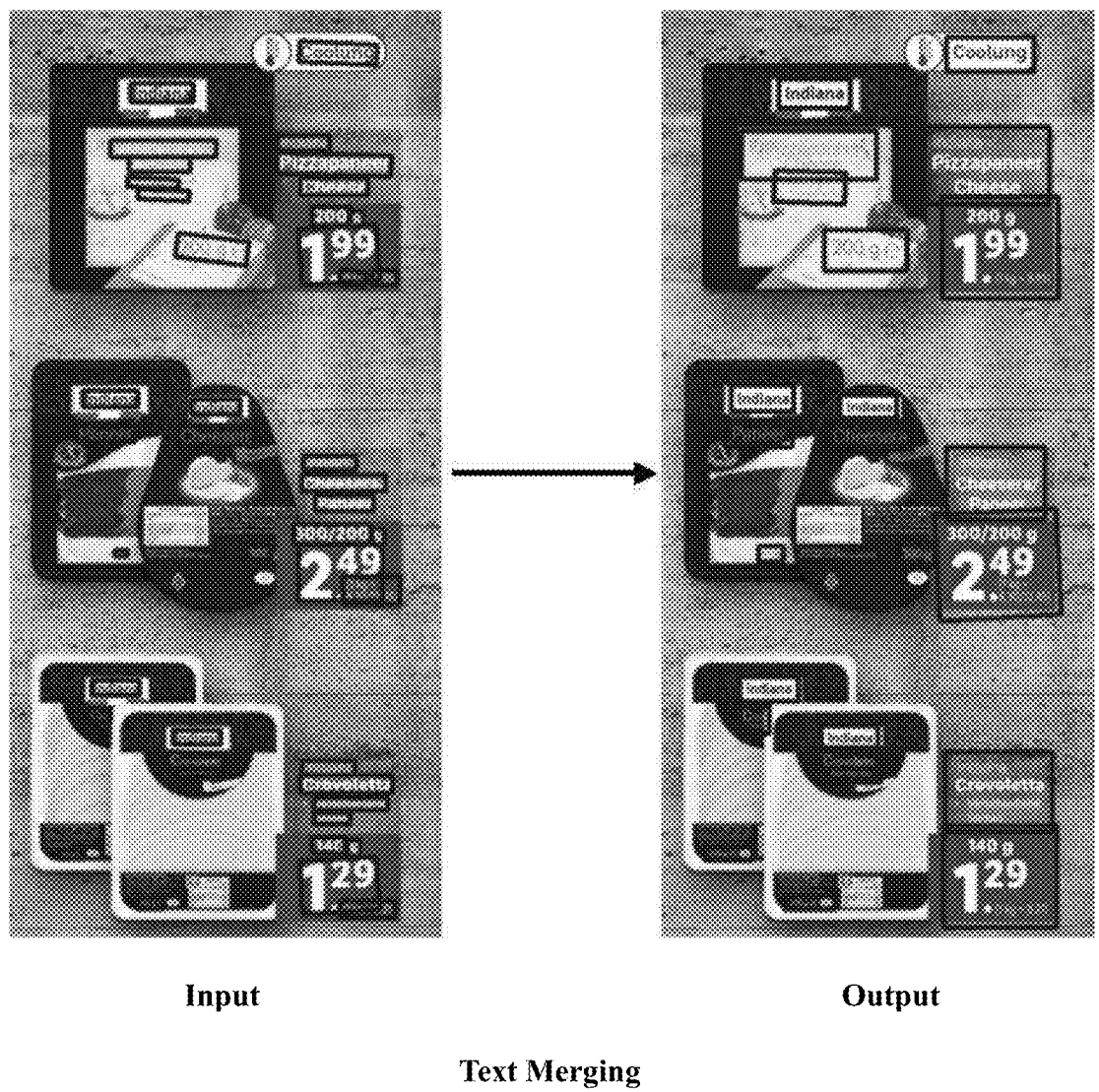
FIG. 6 illustrates an exemplary flyer image text merging using the system of FIG. 1, in accordance with some embodiments of the present disclosure.
Figure 7:
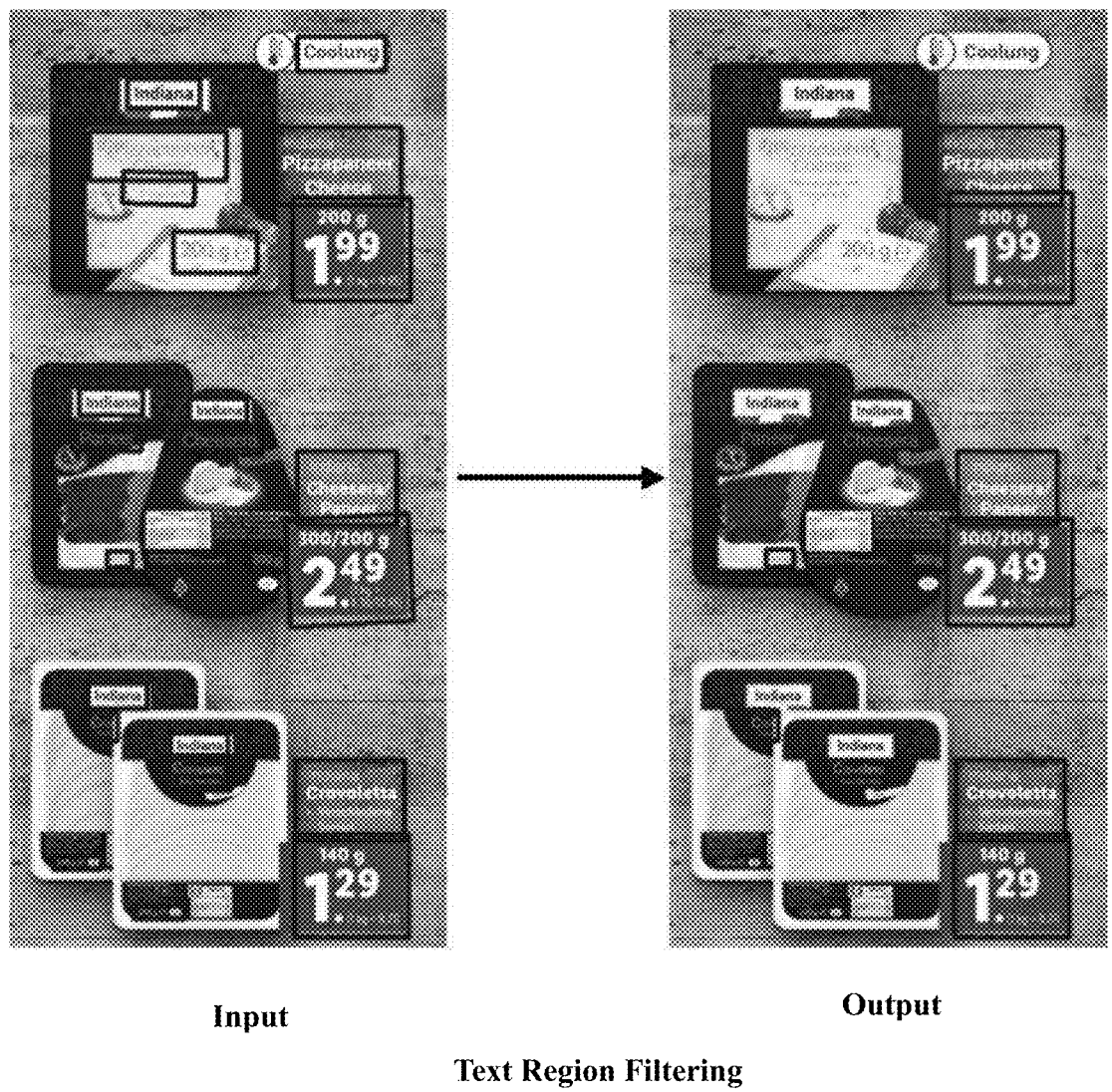
FIG. 7 illustrates an exemplary flyer image with text region filtered using the system of FIG. 1, in accordance with some embodiments of the present disclosure.

Referring now to the steps of the method 300, at step 304, the one or more hardware processors 104 detect a text region comprising a price information from each input image from the input images by creating a bounding box around the detected texts in each input image and merging adjacent text regions bounding boxes and filtering the merged text regions. Considering the above example having the digital flyer image with the product data example as represented as 1 dollar and 0.99 cents. Referring now to FIG. 5 where the text detection module 202 obtains the product data information associated with the digital flyer image as input for detecting one of the text region comprising a price information.

FIG. 5 illustrates an exemplary flyer image detecting text region using the system of FIG. 1, in accordance with some embodiments of the present disclosure. The text regions are detected by creating a bounding box around the detected texts in each product data of the digital flyer image. Further, the detected texts contain individual text character and broken words which is further merged (FIG. 6) adjacent text bounding boxes to form meaningful text cluster. Further the price region(s) are filtered (FIG. 7) from each text region when length to width ratio of bounding box lies within a certain range (2:1 or 1:2 ratio) for the price region(s). Such range shall not be construed as limiting the scope of the present disclosure.

Referring now to the steps of the method 300, at step 306, the one or more hardware processors 104 convert each text region into a two-color text comprising of a set of white pixels and a set of black pixels. The detected text region are fetched by the two-color conversion module 204 to convert into two-color text comprising the set of black pixels and the set of white pixels.

Figure 8:
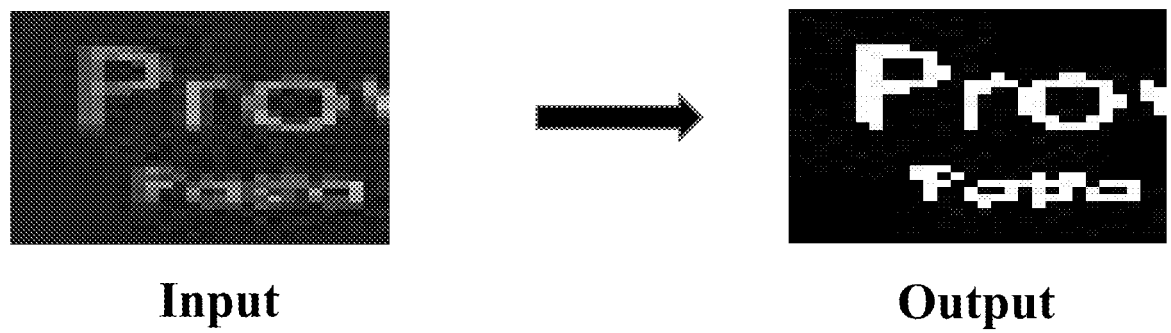
FIG. 8 illustrates an exemplary flyer image converted into a two-color text using the system of FIG. 1, in accordance with some embodiments of the present disclosure.
Figure 8:
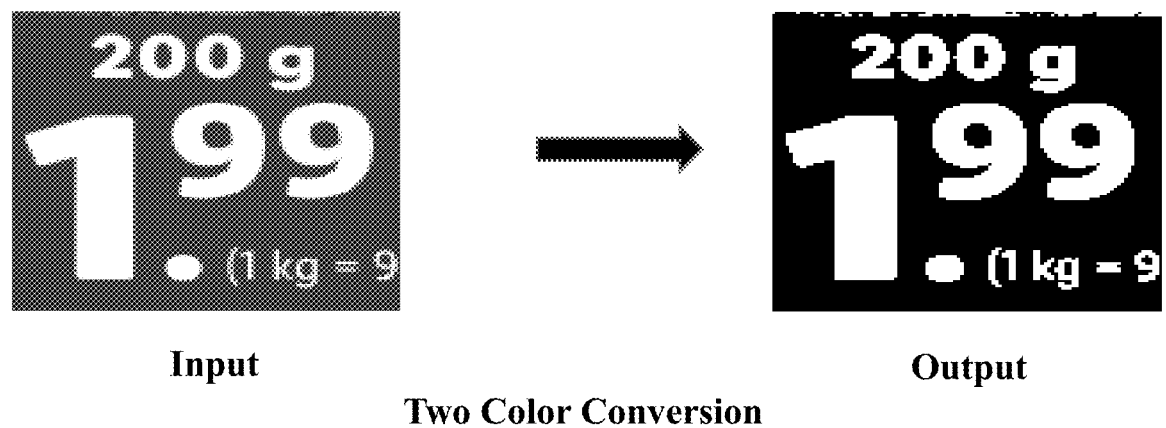

Referring now to FIG. 8 which illustrates an exemplary flyer image converted into a two-color text using the system of FIG. 1, in accordance with some embodiments of the present disclosure. Here, the two-color conversion module 204 performs the steps on each detected text region of the input digital flyer image, Step 1—Change Each text region into a gray scale image and selecting top ranked two peaks from a histogram comprising one or more text regions.

Step 2—Calculate a mean value of boundary pixels of the gray scale image.

Step 3—Calculate a mean range based on the peaks closer to the boundary pixel mean value and the peaks farther to the boundary pixel mean value.

Step 4—Convert one or more pixels in black color which lies within the mean range around peak closer to the boundary pixel mean value and the one or more pixels into white color which falls out of the boundary pixel mean value.

Referring now to the steps of the method 300, at step 308, the one or more hardware processors 104 detect a price region from the two-color text by using a price region detection technique. Considering the above example where the product data of digital flyer image has the represented as 1 dollar and 0.99 cents which is fed as input to the price detection module.

Figure 9A:
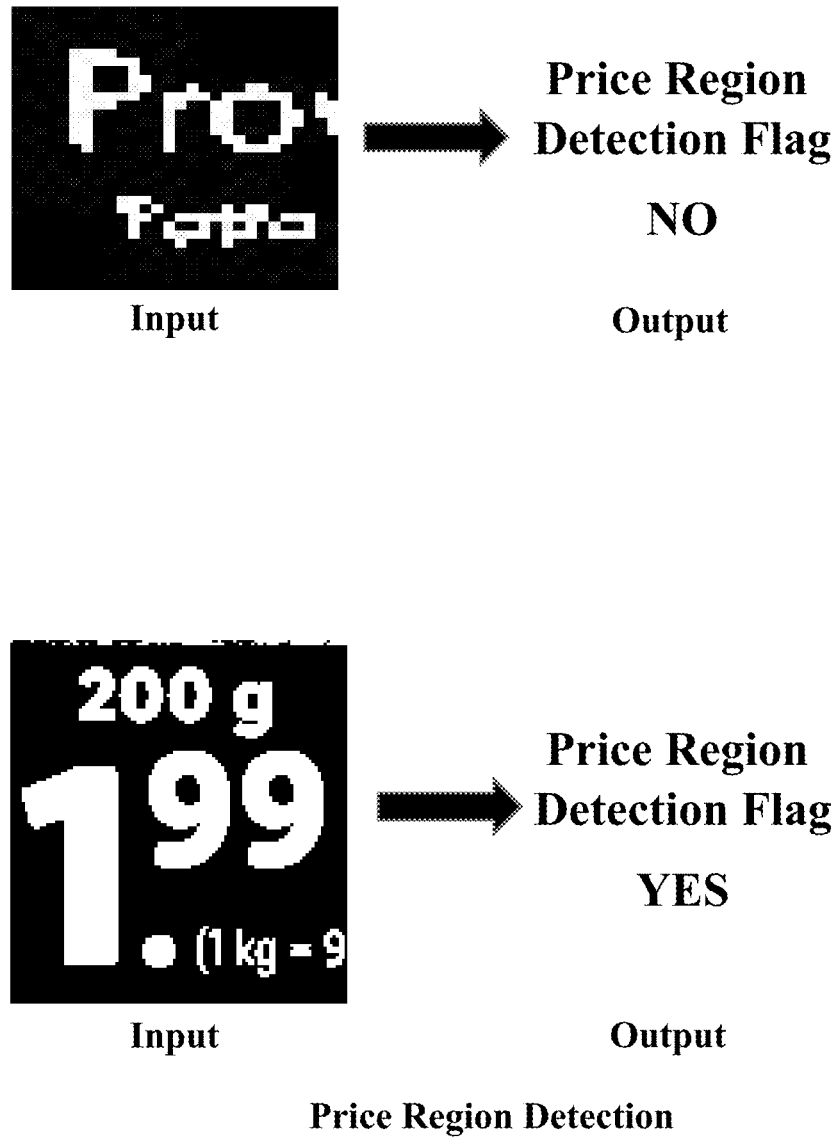
FIG. 9A and FIG. 9B illustrates an exemplary flyer image with detected price region using the system of FIG. 1, in accordance with some embodiments of the present disclosure.

Referring to the above example FIG. 9A, detecting the price region from the two-color text comprises obtaining the two-color text of each input image and initializing a price tag flag status with a false condition. Further, the price tag flag status is configured to be of equivalent to a status of the price region detected from the two-color text. The method performs when the price tag flag status is false condition as mentioned below, Step 1—Determine a one or more connected values corresponding to each text of the two-color text, and selecting the one or more connected values with a maximum height. The one or more connected values is 1, . . . , 9, 9 for which is the 1 dollar and 0.99 cents.

Step 2—Compute a first parameter by merging the one or more connected values aligned to an upper left y-coordinate corresponding to the connected values with the maximum height.

Step 3—Compute a second parameter by merging the one or more connected values aligned to a lower left y-coordinate corresponding to the connected values with the maximum height for filtering noise components associated with the two-color text, and Step 4—Reset the price tag flag status with the price tag flag status of the one or more detected price region based on the first parameter and the second parameter.

Figure 9B:
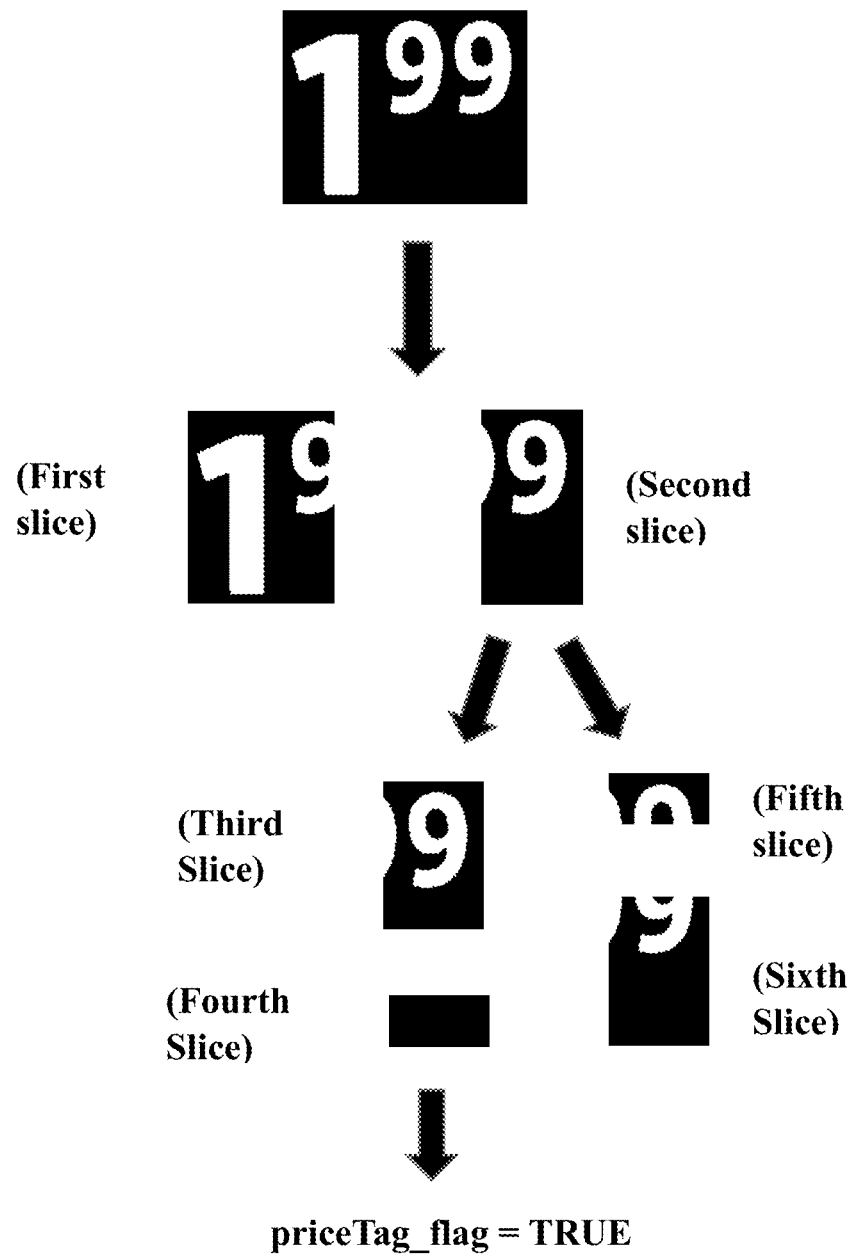
Figure 10A:
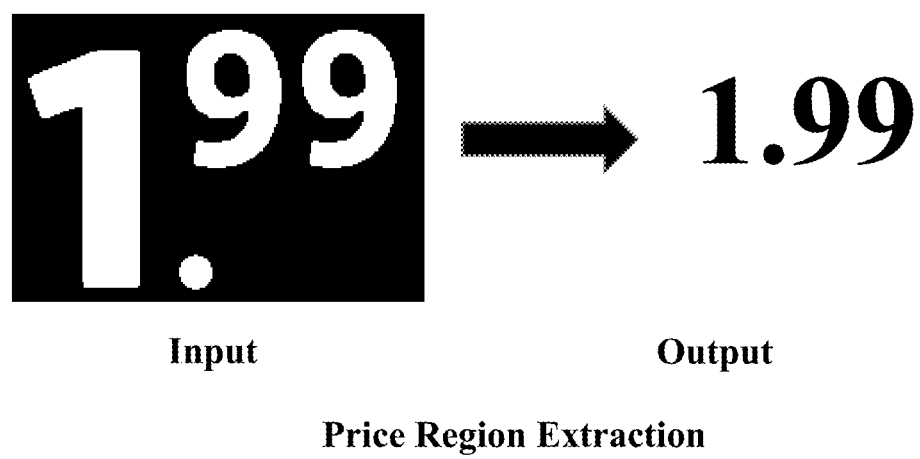
FIG. 10A and FIG. 10B illustrates an exemplary flyer image with extracted price region using the system of FIG. 1, in accordance with some embodiments of the present disclosure.
Figure 10B:
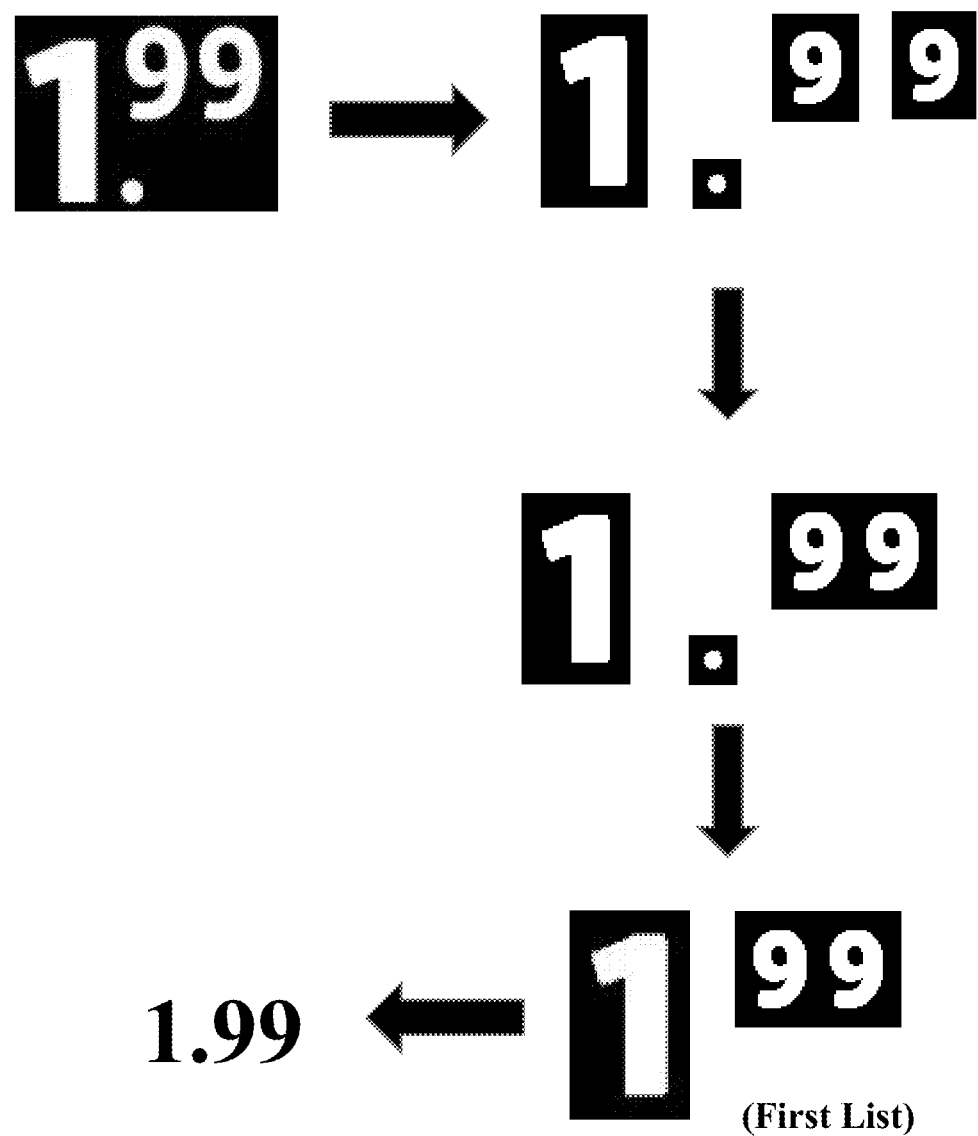

Referring now to FIG. 9B, where the detecting the price region from the two-color text comprises the steps of obtaining the two-color text of each input image and dividing the two-color text region into a first slice and a second slice based on a predefined width ratio. The predefined width ratio may be considered as 60:40 size which was determined by performing experimental evaluation.

Further, the second slice is segmented into at least one of,
a third slice and a fourth slice with a predefined ratio of a first height to locate a relative blank region of the two-color text in accordance with a price region of type 1 comprising a superscript text. The predefined ratio of the first height is considered as 75:25 size, and
a fifth slice and a sixth slice with a predefined ratio of a second height to locate the relative blank region of the two-color text in accordance with a price region of type 2 comprising a subscript text. The predefined ratio of the second height is considered as 25:75 size.

Then, the number of white pixels and the number of black pixels are calculated in the first slice, the third slice, the fourth slice, the fifth slice, and the sixth slice.

Further, the price tag flag status is initialized to false condition and the price tag flag status is set to true for type 1, if non-zero number of the white pixels and the non-zero number of the black pixels are identified in the first slice and the third slice, and zero number of white pixels identified in the fourth slice.

In one embodiment, the price tag flag status is initialized to false condition and the price tag flag status is set to true for type 1, if non-zero number of the white pixels and the non-zero number of the black pixels are identified in the first slice and the third slice and the fourth slice, where minimum relative density of the white pixels in the fourth slice relative to the first slice and the third slice is below a predefined threshold value.

Further, the price tag flag status is initialized to false condition and the price tag flag status is set to true for type 2, if non-zero number of the white pixels and the non-zero number of the black pixels are identified in the first slice and the sixth slice and zero number of white pixels identified in the fifth slice.

Further, the price tag flag status is initialized to false condition and the price tag flag status is set to true for type 2, if non-zero number of the white pixels and the non-zero number of the black pixels are identified in the first slice, the fifth slice, and the sixth slice, where a minimum relative density of the white pixels in the fifth slice relative to the first slice, and the sixth slice is below the predefined threshold value.

Referring now to the steps of the method 300, at step 310, the one or more hardware processors 104 extract the price from the price region of each input image by using a price tag flag status and a price extraction technique. Considering the above example and referring now to FIG. 10A and FIG. 10B, the two-color text input image is fed to the price region extraction module and setting a price region flag status to a false condition. Further, the one or more connected values corresponding to each text is determined to group the one or more connected values based on a height and a position of the text. The one or more groups are aligned and selected with the upper left y-coordinate based on the group having maximum height and each group is recorded in a first list and sorting the first list based on x-coordinates.

The price region from each text from each group in the first list is extracted and merged to form the text string. Then the text string is matched with a price string format. The price region flag status is set to a true condition and the text string is returned with the price region value for a successful match.

Further, for the unmatched text string with the price string format the technique performs by, selecting the one or more groups aligned with the lower left y-coordinates based on the group having maximum height and recording each group in a second list and sorting the second list based on x-coordinates. Further, the text from each group is extracted in the second list and merged to form the text string and the system 100 checks if the text string matches with the price string format If the text string matches with the price string format, the price region flag status is set to true condition and the price region value is returned.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of digital flyers price extraction. The embodiment, thus provides method and system for detecting and extracting price region from digital flyers and promotions. Moreover, the embodiments herein further provides a two-color conversion system that handles color variations in complex flyer images. The price region detection function detects price region accurately and extracts price values having an irregular font size.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for detecting and extracting price region from digital flyers and promotions, the method comprising:

acquiring via one or more hardware processors, a set of digital flyers and promotions as input images from external sources;

detecting via the one or more hardware processors, one or more text regions comprising a price information from each input image from the input images by creating a bounding box around the detected texts including individual text character and broken words in each input image and merging adjacent text regions bounding boxes to form text cluster and filtering the merged text regions when length to width ratio of the bounding box lies within a predefined range, wherein the price information includes different representation of values which varies with font, color, textual information and placement of the textual information;

converting via the one or more hardware processors, each text region into a two-color text comprising of a set of white pixels and a set of black pixels by, (i) changing each text region into a gray scale image and selecting top ranked peaks from a histogram comprising one or more text regions, (ii) calculating a mean value of boundary pixels of the gray scale image, (iii) calculating a mean range based on the peaks closer to the boundary pixel mean value and the peaks farther to the boundary pixel mean value, and (iv) converting one or more pixels in black color which lies within the mean range around peak closer to the boundary pixel mean value and the one or more pixels into white color which falls out of the boundary pixel mean value, wherein converting the each text region into the two-color text for handling color variations in the input images;

detecting via the one or more hardware processors, price region from the two-color text by using a price tag flag status; and extracting via the one or more hardware processors, the price from the price region of each input image by using a price tag flag status, wherein values of the price include an irregular font size.

2. The processor implemented method as claimed in claim 1, wherein detecting the price region from the two-color text by performing the steps of:

obtaining the two-color text of each input image and initializing a price tag flag status with a false condition;

configuring the price tag flag status equivalent to a status of the price region detected from the two-color text; and performing when the price tag flag status is false condition:

determining one or more connected values corresponding to each text of the two-color text, and selecting the one or more connected values with a maximum height;

computing a first parameter by merging the one or more connected values aligned to an upper left y-coordinate corresponding to the connected values with maximum height;

computing a second parameter by merging the one or more connected values aligned to a lower left y-coordinate corresponding to the connected values with the maximum height for filtering noise components associated with the two-color text; and resetting the price tag flag status with the price tag flag status of the one or more detected price region based on the first parameter and the second parameter.

3. The processor implemented method as claimed in claim 2, wherein detecting the price region from the two-color text comprises the steps of:

obtaining the two-color text of each input image and dividing the two two-color text region into a first slice and a second slice based on a predefined width ratio;

segmenting the second slice into at least one of,
- a third slice and a fourth slice with a predefined ratio of a first height to locate a relative blank region of the two-color text in accordance with a price region comprising a superscript text, and
- a fifth slice and a sixth slice with a predefined ratio of a second height to locate the relative blank region of the two-color text in accordance with a price region comprising a subscript text;

calculating the number of white pixels and the number of black pixels in the first slice, the third slice, the fourth slice, the fifth slice, and the sixth slice; and initializing the price tag flag status to false condition and setting the price tag flag status,
- true for the price region comprising the superscript text, if non-zero number of the white pixels and the non-zero number of the black pixels are identified in the first slice and the third slice, and zero number of white pixels identified in the fourth slice,
- true for the price region comprising the superscript text, if non-zero number of the white pixels and the non-zero number of the black pixels are identified in the first slice and the third slice and the fourth slice, where minimum relative density of the white pixels in the fourth slice relative to the first slice and the third slice is below a predefined threshold value,
- true for the price region comprising the subscript text, if non-zero number of the white pixels and the non-zero number of the black pixels are identified in the first slice and the sixth slice and zero number of white pixels identified in the fifth slice,
- true for the price region comprising the subscript text, if non-zero number of the white pixels and the non-zero number of the black pixels are identified in the first slice and the sixth slice and the fifth slice, where a minimum relative density of the white pixels in the fifth slice relative to the first slice, and the sixth slice is below the predefined threshold value.

4. The processor implemented method as claimed in claim 1, wherein extracting the price from the price region of each input image comprises:

inputting the two-color text input image and setting a price region flag status to a false condition;

determining the one or more connected components corresponding to each text and grouping the one or more connected components based on a height and a position of the text;

selecting the one or more groups aligned with the upper left y-coordinate based on the group having maximum height and recording each group in a first list and sorting the first list based on x-coordinates;

extracting text from each group in the first list and merging to form the text string;

performing when,
- text string matches with a price string format, then the price region flag status is set to a true condition and returning the text string as the price region value;
- text string does not match with the price string format then perform,
  - selecting the one or more groups aligned with the lower left y-coordinates based on the group having maximum height and recording each group in a second list and sorting the second list based on x-coordinates;
  - extracting text from each group in the second list and merging to form the text string; and
  - checking if the text string matches with the price string format, then set the price region flag status to true condition and return the price region value.

5. A system for detecting and extracting price region from digital flyers and promotions, comprising:

a memory storing instructions;

one or more communication interfaces; and one or more hardware processors coupled to the memory via the one or more communication interfaces, wherein the one or more hardware processors are configured by the instructions to:

acquire, a set of digital flyers and promotions as input images from external sources;

detect, one or more text regions comprising a price information from each input image from the input images by creating a bounding box around the detected texts including individual text character and broken words in each input image and merging adjacent text regions bounding boxes to form text cluster and filtering the merged text regions when length to width ratio of the bounding box lies within a predefined range, wherein the price information includes different representation of values which varies with font, color, textual information and placement of the textual information;

convert, each text region into a two-color text comprising of a set of white pixels and a set of black pixels by, (i) changing each text region into a gray scale image and selecting top ranked two peaks from a histogram comprising one or more text regions, (ii) calculating a mean value of boundary pixels of the gray scale image, (iii) calculating a mean range based on the peaks closer to the boundary pixel mean value and the peaks farther to the boundary pixel mean value, and (iv) converting one or more pixels in black color which lies within the mean range around peak closer to the boundary pixel mean value and the one or more pixels into white color which falls out of the boundary pixel mean value, wherein converting the each text region into the two-color text for handling color variations in the input images;

detect, the price region from the two-color text by using a price tag flag status; and extract, the price from the price region of each input image by using a price tag flag status, wherein values of the price include an irregular font size.

6. The system of claim 5, wherein identifying the price region from the two-color text by performing the steps of:
  obtain the two-color text of each input image and initializing a price tag flag status with a false condition;
  configure the price tag flag status equivalent to a status of the price region detected from the two-color text;
  perform when the price tag flag status is false condition:
    determine one or more connected values corresponding to each text of the two-color text, and select the one or more connected values with a maximum height;
    compute a first parameter by merging the one or more connected values aligned to an upper left y-coordinate corresponding to the connected values with the maximum height;
    compute a second parameter by merging the one or more connected values aligned to a lower left y-coordinate corresponding to the connected values with the maximum height for filtering noise components associated with the two-color text; and
    reset the price tag flag status with the price tag flag status of the one or more detected price region based on the first parameter and the second parameter.

7. The system of claim 6, wherein detecting the price region from the two-color text comprises the steps of:
  obtain the two-color text of each input image and dividing the two-color text region into a first slice and a second slice based on a predefined width ratio;
  segment the second slice into at least one of,
    a third slice and a fourth slice with a predefined ratio of a first height to locate a relative blank region of the two-color text in accordance with a price region comprising a superscript text, and
    a fifth slice and a sixth slice with a predefined ratio of a second height to locate the relative blank region of the two-color text in accordance with a price region comprising a subscript text;
  calculate the number of white pixels and the number of black pixels in the first slice, the third slice, the fourth slice, the fifth slice, and the sixth slice; and
  initialize the price tag flag status to false condition and setting the price tag flag status,
    true for the price region comprising the superscript text, if non-zero number of the white pixels and the non-zero number of the black pixels are identified in the first slice and the third slice, and zero number of white pixels identified in the fourth slice,
    true for the price region comprising the superscript text, if non-zero number of the white pixels and the non-zero number of the black pixels are identified in the first slice and the third slice and the fourth slice, where minimum relative density of the white pixels in the fourth slice relative to the first slice and the third slice is below a predefined threshold value,
    true for the price region comprising the subscript text, if non-zero number of the white pixels and the non-zero number of the black pixels are identified in the first slice and the sixth slice and zero number of white pixels identified in the fifth slice, and
    true for the price region comprising the subscript text, if non-zero number of the white pixels and the non-zero number of the black pixels are identified in the first slice and the sixth slice and the fifth slice, where a minimum relative density of the white pixels in the fifth slice relative to the first slice, and the sixth slice is below the predefined threshold value.

8. The system of claim 5, wherein extracting the price from the price region of each input image comprises:
  input the two-color text input image and setting a price region flag status to a false condition;
  determine the one or more connected components corresponding to each text and grouping the one or more connected components based on a height and a position of the text;
  select the one or more groups aligned with the upper left y-coordinate based on the group having maximum height and recording each group in a first list and sorting the first list based on x-coordinates;
  extract text from each group in the first list and merging to form the text string; and
  perform when,
    text string matches with a price string format, then the price region flag status is set to a true condition and returning the text string as the price region value,
    text string does not match with the price string format then perform,
      select the one or more groups aligned with the lower left y-coordinates based on the group having maximum height and recording each group in a second list and sorting the second list based on x-coordinates; and
      extracting text from each group in the second list and merging to form the text string; and
      checking if the text string matches with the price string format, then set the price region flag status to true condition and return the price region value.

9. One or more non-transitory machine-readable information storage mediums comprising one or more instructions which when executed by one or more hardware processors cause:
  acquiring a set of digital flyers and promotions as input images from external sources;
  detecting one or more text regions comprising a price information from each input image from the input images by creating a bounding box around the detected texts including individual text character and broken words in each input image and merging adjacent text regions bounding boxes to form text cluster and filtering the merged text regions when length to width ratio of the bounding box lies within a predefined range, wherein the price information includes different representation of values which varies with font, color, textual information and placement of the textual information;
  converting each text region into a two-color text comprising of a set of white pixels and a set of black pixels by, (i) changing each text region into a gray scale image and selecting top ranked two peaks from a histogram comprising one or more text regions, (ii) calculating a mean value of boundary pixels of the gray scale image, (iii) calculating a mean range based on the peaks closer to the boundary pixel mean value and the peaks farther to the boundary pixel mean value, and (iv) converting one or more pixels in black color which lies within the mean range around peak closer to the boundary pixel mean value and the one or more pixels into white color which falls out of the boundary pixel mean value, wherein converting the each text region into the two-color text for handling color variations in the input images;

detecting the price region from the two-color text by using a price tag flag status; and extracting the price from the price region of each input image by using a price tag flag status, wherein values of the price include an irregular font size.

10. The one or more non-transitory machine-readable information storage mediums of claim 9, wherein detecting the price region from the two-color text by performing the steps of:
obtaining the two-color text of each input image and initializing a price tag flag status with a false condition;
configuring the price tag flag status equivalent to a status of the price region detected from the two-color text; and
performing when the price tag flag status is false condition:
determining a one or more connected values corresponding to each text of the two-color text, and selecting the one or more connected values with a maximum height;
computing a first parameter by merging the one or more connected values aligned to an upper left y-coordinate corresponding to the connected values with maximum height;
computing a second parameter by merging the one or more connected values aligned to a lower left y-coordinate corresponding to the connected values with the maximum height for filtering noise components associated with the two-color text; and
resetting the price tag flag status with the price tag flag status of the one or more detected price region based on the first parameter and the second parameter.

11. The one or more non-transitory machine-readable information storage mediums of claim 10, wherein detecting the price region from the two-color text comprises the steps of:
obtaining the two-color text of each input image and dividing the two-color text region into a first slice and a second slice based on a predefined width ratio;
segmenting the second slice into at least one of,
a third slice and a fourth slice with a predefined ratio of a first height to locate a relative blank region of the two-color text in accordance with a price region comprising a superscript text, and
a fifth slice and a sixth slice with a predefined ratio of a second height to locate the relative blank region of the two-color text in accordance with a price region comprising a subscript text;
calculating the number of white pixels and the number of black pixels in the first slice, the third slice, the fourth slice, the fifth slice, and the sixth slice; and
initializing the price tag flag status to false condition and setting the price tag flag status,
true for the price region comprising the superscript text, if non-zero number of the white pixels and the non-zero number of the black pixels are identified in the first slice and the third slice, and zero number of white pixels identified in the fourth slice,
true for the price region comprising the superscript text, if non-zero number of the white pixels and the non-zero number of the black pixels are identified in the first slice and the third slice and the fourth slice, where minimum relative density of the white pixels in the fourth slice relative to the first slice and the third slice is below a predefined threshold value,
true for the price region comprising the subscript text, if non-zero number of the white pixels and the non-zero number of the black pixels are identified in the first slice and the sixth slice and zero number of white pixels identified in the fifth slice,
true for the price region comprising the subscript text, if non-zero number of the white pixels and the non-zero number of the black pixels are identified in the first slice and the sixth slice and the fifth slice, where a minimum relative density of the white pixels in the fifth slice relative to the first slice, and the sixth slice is below the predefined threshold value.

12. The one or more non-transitory machine-readable information storage mediums of claim 9, wherein extracting the price from the price region of each input image comprises:
inputting the two-color text input image and setting a price region flag status to a false condition;
determining the one or more connected components corresponding to each text and grouping the one or more connected components based on a height and a position of the text;
selecting the one or more groups aligned with the upper left y-coordinate based on the group having maximum height and recording each group in a first list and sorting the first list based on x-coordinates;
extracting text from each group in the first list and merging to form the text string;
performing when,
text string matches with a price string format, then the price region flag status is set to a true condition and returning the text string as the price region value,
text string does not match with the price string format then perform,
selecting the one or more groups aligned with the lower left y-coordinates based on the group having maximum height and recording each group in a second list and sorting the second list based on x-coordinates;
extracting text from each group in the second list and merging to form the text string; and
checking if the text string matches with the price string format, then set the price region flag status to true condition and return the price region value.

* * * * *